United States Patent [19]

Ueda et al.

[11] Patent Number: 4,833,711
[45] Date of Patent: May 23, 1989

[54] SPEECH RECOGNITION SYSTEM WITH GENERATION OF LOGARITHMIC VALUES OF FEATURE PARAMETERS

[75] Inventors: Toru Ueda, Yamatokoriyama; Yoshiki Nishioka, Tenri, both of Japan

[73] Assignee: Computer Basic Technology Research Assoc., Tokyo, Japan

[21] Appl. No.: 543,497

[22] Filed: Oct. 19, 1983

[30] Foreign Application Priority Data

Oct. 28, 1982 [JP] Japan ............................. 57-190600

[51] Int. Cl.$^4$ ............................................. G10L 5/00
[52] U.S. Cl. ..................................... 381/43; 328/145; 381/47; 375/98
[58] Field of Search ..................... 381/36–50; 364/200, 900, 513.5, 513, 715, 722; 382/16, 34; 328/145; 375/98

[56] References Cited

U.S. PATENT DOCUMENTS

| | | | |
|---|---|---|---|
| 3,327,058 | 6/1967 | Coker | 381/50 |
| 3,832,491 | 8/1974 | Sciulli et al. | 381/46 |
| 3,975,587 | 8/1976 | Dunn et al. | 381/49 |
| 4,008,375 | 2/1977 | Lanier | 381/46 |
| 4,158,750 | 6/1979 | Sakoe et al. | 381/43 |
| 4,243,837 | 1/1981 | Bertholon | 381/46 |
| 4,256,924 | 3/1981 | Sakoe | 381/43 |
| 4,370,521 | 1/1983 | Johnston et al. | 381/41 |
| 4,509,186 | 4/1985 | Omura et al. | 381/43 |
| 4,520,500 | 5/1985 | Mizuno et al. | 381/43 |
| 4,591,928 | 5/1986 | Bloom et al. | 360/13 |

Primary Examiner—Emanuel S. Kemeny
Attorney, Agent, or Firm—Birch, Stewart, Kolasch & Birch

[57] ABSTRACT

In a speech recognition system, logarithmic amplifiers avoid low level signal or noise problems by clamping all signals below an input threshold to a constant output level.

7 Claims, 3 Drawing Sheets

SPEECH RECOGNITION SYSTEM WITH GENERATION OF LOGARITHMIC VALUES OF FEATURE PARAMETERS

BACKGROUND OF THE INVENTION

The present invention relates to an improvement of a recognition system such as a speech recognition device, more particularly, to an improvement related to the formation of feature parameters in a recognition system utilizing a specific logarithm of the filter bank output which is the feature parameter.

Conventionally, for example, when using a logarithm of a filter bank output which is the feature parameter, the following equation is applied in order to convert logarithmic values.

$$Wi = A\log Pi + B$$

where A and B are constants, Pi is the feature parameter before the logarithm is effected, and Wi is the feature parameter after the logarithm is effected.

According to a recognition system that applies the conversion method, depending upon the character of the logarithmic curve used, if the feature parameter has a negligible value, the logarithmic output can be significantly varied even when a negligible variation is applied to the value Pi. As a result, if the feature parameter has a value near zero in a channel, this channel can be adversely affected either by internally generated electrical noise or by external noise.

In a matching device, if a variable coefficient is used, for example, via a Kalman filter as disclosed by the officially disclosed pending Japanese Patent, Tokukai-sho 56-133800 "SPEECH RECOGNITION SYSTEM", when the varied coefficient drops almost to zero, its value may vary significantly, thus requiring a large number of bits for executing recognition calculations.

OBJECT AND SUMMARY OF THE INVENTION

The present invention aims at providing a recognition system incorporating means for properly converting the feature parameter values so that a channel having the feature parameter is prevented from being adversely affected by electrical noise even when the feature parameter drops to a level near zero, thus eliminating the problem described above.

A preferred embodiment of the present invention provides a recognition system using a logarithm of the feature parameters with means for properly converting a low value of said feature parameter into a specific level by raising the value so that unwanted variation of said feature parameter is ideally restricted.

As described above, in a recognition system using a logarithm of feature parameters, when an unwanted variation of the feature parameters is properly restricted by recovering the low value of said feature parameter to a specific level, even if the feature parameter in a channel has a level near zero, the channel cannot be adversely affected by electrical noise. In addition, when a recognition system uses a specific rate of varying the value of the feature parameter from one frame to the next frame, such as in a Kalman filter, by raising the minimum value to an optimum level using means embodied by the present invention, the feature parameter level will be prevented from reaching a greater peak during variation when compared to conventional techniques. As a result, a recognition process can be smoothly executed by performing calculations without using a large number of bits.

BRIEF DESCRIPTION OF DRAWINGS

The present invention will become better understood from the detailed description given below and the accompanying drawings which are given by way of illustration only, and thus are not limitative of the present invention and wherein.

DETAILED DESCRIPTION OF THE PREFERRED EMBODIMENT

A preferred embodiment of the present invention is described below.

A preferred embodiment of the present invention provides the following formulas (2) for converting logarithm so that the speech feature parameter is correctly regulated.

$$Wi = \begin{cases} K & ; A\log Pi + B \leq K \\ A\log Pi + B & ; A\log Pi + B > K \end{cases} \quad (2)$$

By correctly determining a value Wi by executing a logarithmic conversion against the feature parameter Pi according to the formulas (2) shown above, even though a channel has its feature parameter value Pi placed in a position near zero, this channel cannot easily be affected by electrical noise. Also, if a specific feature parameter variation rate is applied to the recognition system in relation to the preceding frame, such as in the Kalman filter, since the lowest level of the feature parameter can be raised to a specific level K by applying the above formulas (2), variation of the feature parameter can be restricted without reaching a great peak level, and as a result, a calculation can be smoothly executed without requiring a large number of bits. In reference to the attached drawings, a preferred embodiment of the present invention is described below.

Figure 1:
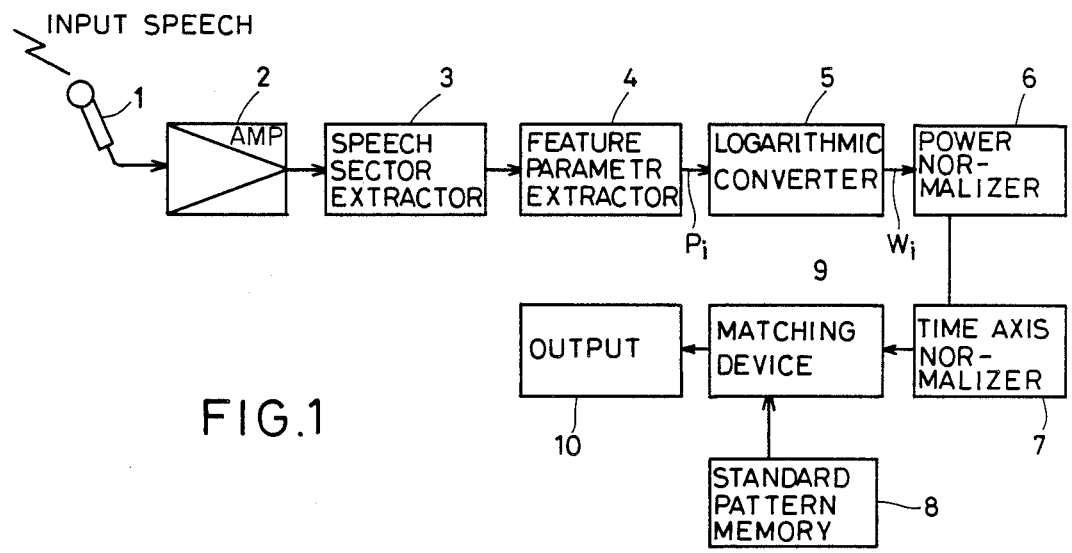
FIG. 1 is a simplified block diagram of a speech recognition system incorporating means embodied by the present invention.
Figure 2:
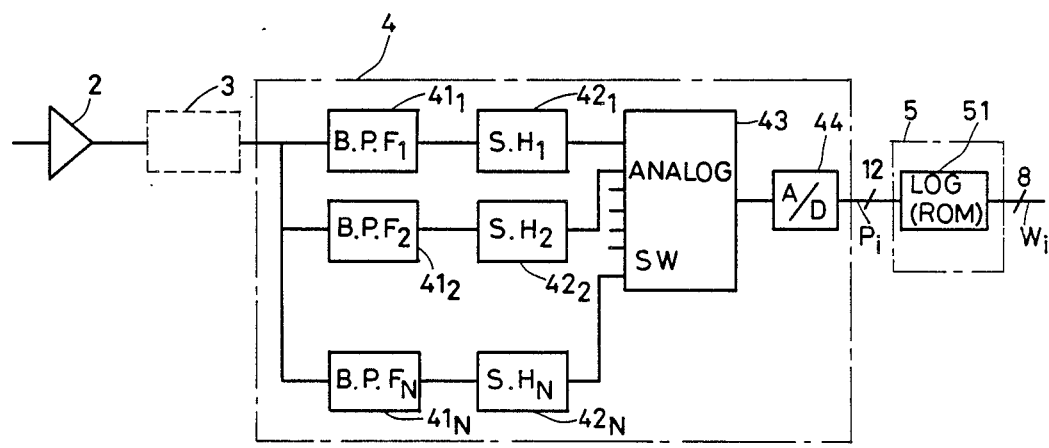
FIG. 2 is a simplified block diagram of the main part of the speech recognition system incorporating means embodied by the present invention.

FIG. 1 is a simplified block diagram of a speech recognition system incorporating a preferred embodiment of the present invention. Speech generated by a person is converted into electrical signals by detector 1, a microphone, in which said detector 1 detects a range of frequencies from 25 Hz through 15,000 Hz, frequencies that are audible to another person. Such a detector 1 should desirably be capable of detecting all the frequencies corresponding to the human speech areas without distortion. An amplifier 2 is connected to the output of said detector 1. This amplifier 2 should desirably be capable of amplifying all of the frequencies corresponding to the human speech areas without distortion. A speech sector extractor 3 is connected to the output of said amplifier 2, while said speech sector extractor 3 provides both the speech recognition start and end timings, and then speech signals within the speech sector are sent to the following feature parameter extractor 4. The feature parameter extractor 4, as shown in FIG. 2, is composed of an A/D converter 44 that sequentially converts signals sent from a plurality of band-pass filters $41_l$ through $41_n$ having different bandwidth to deal with, sample-hold circuits $42_l$ through $42_n$, signals from an analog switch 43 that sequentially samples signals from said sample-hold circuits $42_l$ through $42_n$ at 10 microseconds intervals, and signals from said analog switch 43, into, for example, 12 bit digital signals before eventually sending out said feature parameter Pi. Feature parameter extracted from said feature parameter extractor 4 is converted into a logarithm by the logarithm converter 5, which then becomes the feature parameter Wi, which is then normalized by the following power normalizer 6 and the time axis normalizer 7 so that the normalized feature parameter and the standard feature parameter that is memorized by the standard pattern memory 8 are compared to teach other by the matching device 9, and so the input speech is recognized before the result is fed to the output 10.

Figure 3:
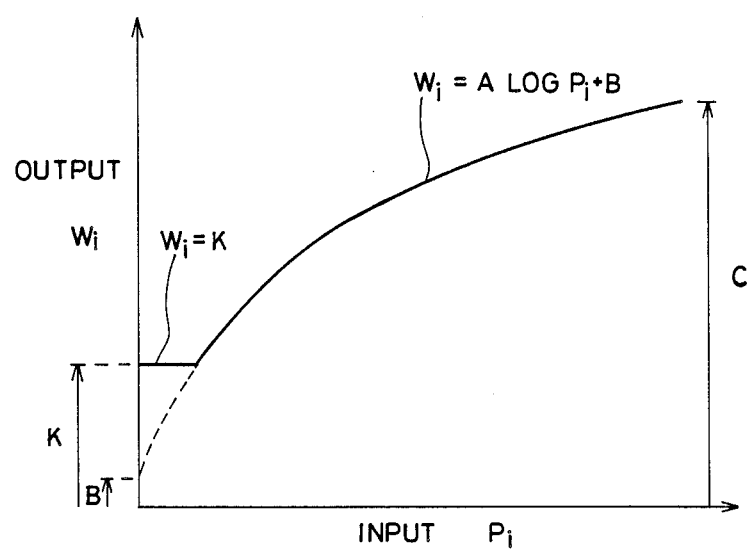
FIG. 3 shows the relationship between the input and output of the logarithmic conversion embodied by the present invention.

As shown in FIG. 2, said logarithm converter 5 is composed of the logarithm converter ROM 51, which stores the input Pi for converting it into the output Wi as shown by the solid line in FIG. 3. In other words, ROM 51 functions, for example, on receipt of 12 bit input signals, ROM 51 outputs said input Pi as an 8 bit output value Wi which is converted by said formulas (2). Thus, the output from band-pass filter $41_l$ through $41_n$ is sequentially converted into 12 bit digital signals by an A/D converter 44, and as a result, the value of the A/D converted feature parameter Pi is processed by the logarithmic conversion according to the formulas (2) shown earlier. As a result, even if the value Pi is variable due to the effect of noise because a small input value Pi exists, the output will still remain at a specific value K, thus minimizing all the adverse effects of the noise.

Against the ensuing frame, a possibility of causing variation to occur to a peak level is reduced from the past relationship of C/B to C/K, particularly when a variable amount is applied to the matching section 9 via a Kalman filter, and as a result, the calculation efficiency can be significantly improved.

Next, a comparison is made between the cases when only input signals are used and when noise of the output 10 is mixed additionally into the frequency axis using the embodiment of the present invention and a conventional technique.

The following shows examples of numerical values when the output signal from band-pass filter is used as the feature parameter, which is then A/D-converted by 12 bit digital signals so that they are eventually converted into 8 bit signals via the logarithmic conversion, in which the conventional logarithmic conversion formula is represented as $Wi = A\log Pi + B$, whereas the logarithmic conversion embodied by the present invention is formulated as shown below.

$$Wi = \begin{cases} A\log Pi + B & ; \quad A\log Pi + B > K \\ K & ; \quad A\log Pi + B \leq K \end{cases}$$

In the above equations, if $A=25.8, B=40$, and $K=A\log 50 + B$ (where $0 < Pi \leq 4095$), the Euclidean distance di between the noise-free filter bank output (Pi) and the noise-mixed output (pi+10) is represented by the equation below.

When the noise is absent, $Wi = A\log Pi + B$, and when noise is present, $Wi' = A\log (Pi + 10) + B$. As a result, the Euclidean distance is eventually obtained by the equation shown below.

$$\text{Euclidean distance } di = (Wi - Wi')^2 \qquad (3)$$
$$= A^2 \left\{ \log\left(1 + \frac{10}{Pi}\right) \right\}^2$$

Figure 4:
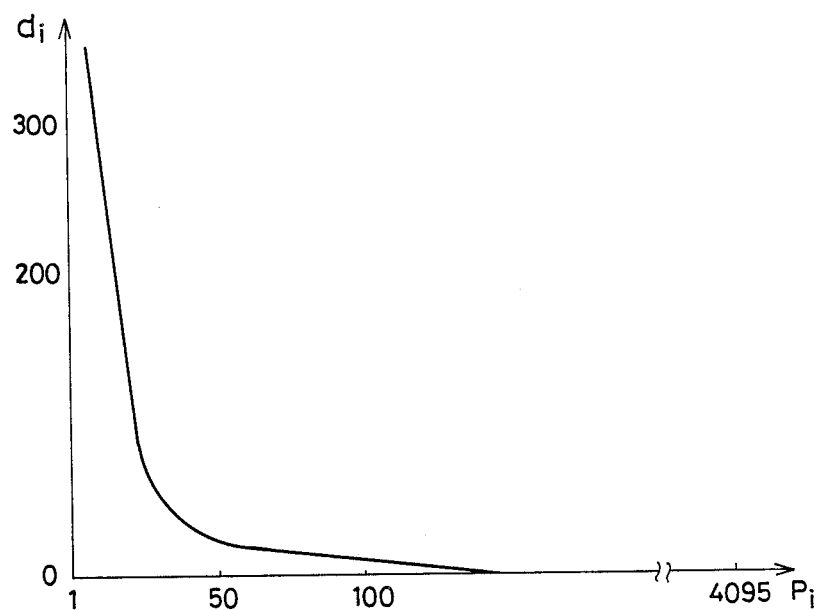
FIG. 4 shows the influence of noise affecting the recognition system using a conventional feature parameter.

Euclidean distance di represented by the above equation (3) is based on the conventional feature parameter technique means, the characteristics of which are shown in FIG. 4.

Conversely, according to the embodiment of the present invention, if $0 < Pi \leq 40$, then $Wi = Wi' = A\log 50 + B = K$ and as a result, di=0. Likewise, if $40 < Pi \leq 50$, then $Wi = A\log 50 + B$, and $Wi' = A\log(Pi + 10) + B$. Consequently, the Euclidean distance di is represented by the equation shown below.

$$di = A^2 \left( \log \frac{Pi + 10}{50} \right)^2$$

If $50 < Pi$, the Euclidean distance di is represented by the following conventional equation.

$$di = A^2 \left\{ \log\left(1 + \frac{10}{Pi}\right) \right\}^2$$

Figure 5:
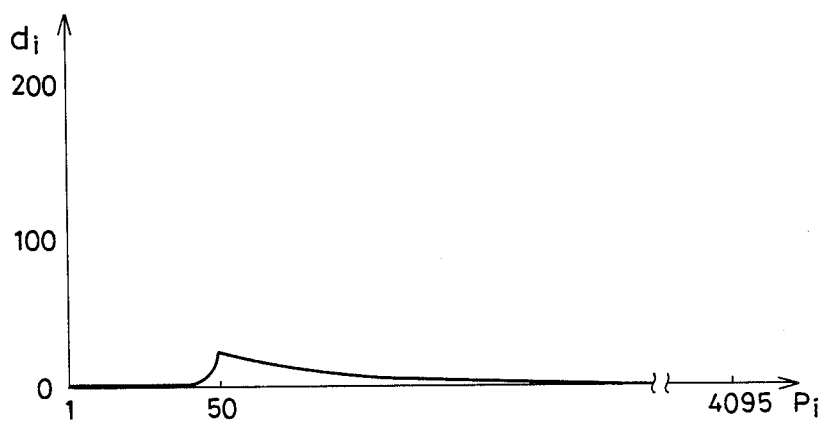
FIG. 5 shows the minimized noise in the recognition system incorporating the logarithmic conversion means embodied by the present invention.

The relationship between the Euclidean distance di and input Pi embodied by the present invention is shown in FIG. 5.

As is clear from the FIGS. 4 and 5, if the filter bank output, is insufficient when using a conventional means, then the Euclidean distance di may be extremely extended by merely causing Pi to vary from a value of 10 out to a maximum of 4096, indicating that the conventional means is significantly vulnerable to noise. Such a defect can however by completely eliminated by raising the insufficient filter bank output to a specific level using the preferred embodiment of the present invention.

If the i−th filter bank output at time t is Pi−t, a variation amount, a, of the feature parameter against the next frame is calculated for both the conventional feature parameter technique and the embodiment of the present invention as shown below, where the worst case of variation is represented by $Pi - t = 1$, and $Pi - t = 1 = 4095$.

Conventional means;

$$a = \frac{A\log 4095 + B}{A\log 1 + B} \; (=6.36)$$

The embodiment of the present invention;

$$a = \frac{A\log 4095 + B}{K} \; (=1.81)$$

Since $A\log 1 + B < K$, variable amount a is minimized by the present invention. Note that values in parenthesis indicate those which are the result of using the above numerical examples. If such a variable amount "a" is not used at all, $B = -K$ can be applied, and as a result, dynamic range can be significantly expanded.

The present invention, thus described in reference to the annexed drawings, may obviously be varied in many ways. It should be understood, however, that such variations are not to be regarded as a departure from the spirit and scope of the invention thus described, and all such modifications as would be obvious to one skilled in the art are to be included within the scope of the following claims.

What is claimed is:

1. In a speech recognition system utilizing a generator of feature parameters, the improvement comprising:

extractor means for producing a feature parameter signal from a signal containing speech information; and converter means for transforming said feature parameter signal into a logarithmic signal wherein said converter means produces a first constant value when said feature parameter signal has a value less than a specific threshold value, and a second value corresponding to a logarithm of said feature parameter signal, when said feature parameter signal is at least as great as said specific threshold value.

2. In a speech recognition system, the improvement comprising:

extractor means for producing a feature parameter signal from a signal containing speech information; and converter means for transforming an input signal into a logarithmic signal, said input signal including said feature parameter signal, wherein said converter means produces said logarithmic signal in accordance with the following formula, $W = K$ when $Pi < K$ $W = A\log Pi + B$; $Pi \geq K$ where W equals the logarithmic signal, A and B are specified constants, Pi is said input signal and K is a specified threshold value.

3. The system of claim 2 wherein said input signal $= Pi + N$ wherein Pi equals said feature parameter signal and N equals a noise signal.

4. A speech recognition system, comprising speech input means for detecting speech signals and producing a speech sector signal;

feature extractor means for producing a feature parameter signal from said speech sector signal;

logarithmic converter means for transforming said feature parameter signal into a logarithmic signal wherein said logarithmic converter means produces a first constant value as said logarithmic signal when said feature parameter signal has a value less than a specific threshold value, and produces a second value as said logarithmic signal, said second value being a logarithm of said feature parameter signal, when said feature parameter signal is at least as great as said specific threshold value; and means for normalizing said logarithmic signal.

5. The system of claim 4 wherein said feature extractor means comprises:

a plurality of bandpass filters each having different frequency bandwidths that receive said speech sector signal, each bandpass filter producing a filter output signal; a plurality of sample-hold circuits, one of said sample-hold circuits associated with each of said bandpass filters, each sample-hold circuit receiving a said filter output signal and producing a sample signal from said filter output;

analog switching means for sequentially accessing said sample signals from each of said sample-hold circuits and producing a composite analog signal; and converter means for digitizing said composite analog signal, thereby producing said feature parameter signal.

6. The system of claim 4 wherein said speech input means, comprises:

a microphone that detects speech signals;

an amplifier that produces amplified speech signals; and a sector extractor that extracts speech sector signals from said amplified speech signals.

7. The system of claim 4 wherein said means for normalizing includes a power normalizer; and a time axis normalizer.

* * * * *